United States Patent Office 2,990,326
Patented June 27, 1961

---

2,990,326
SULFONYL-URETHANES AND A PROCESS FOR PREPARING THEM
Walter Aumüller, Gerhard Korger, Rudi Weyer, and Wolf-Helmut Wagner, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed July 8, 1958, Ser. No. 747,114
Claims priority, application Germany July 9, 1957
7 Claims. (Cl. 167—51.5)

It is known that p-toluene-sulfonyl-urethanes are obtained by causing alcohols to act upon p-toluene-sulfonyl-isocyanate. For example German Patent 845,042 discloses the production of N-(p-toluene-sulfonyl)-isopropyl-urethane by reacting p-toluene-sulfonyl-isocyanate with isopropyl alcohol. In the same patent the N-(p-toluene-sulfonyl)-methyl-urethane is mentioned. Furthermore, the reesterification of N-(p-toluene-sulfonyl)-isopropyl-urethane or of N-(p-toluene-sulfonyl)-methyl-urethane with dodecyl alcohol into N-(p-toluene sulfonyl)-dodecyl-urethane is described.

It was likewise proposed to prepare sulfonyl-urethanes lowering the blood sugar level and suitable to be administered as oral antidiabetics by treating sulfonyl-isocyanates of the general formula $$R-SO_2-NCO$$

wherein R represents a phenyl radical in which one or two hydrogen atoms can be substituted by alkyl or alkoxy groups with at most six carbon atoms or by halogen atoms, or a naphthyl-(2), a 5,6,7,8-tetra-hydronaphthyl-(2), a 4-phenoxy-benzene, a 4-diphenyl radical or an alkyl, cycloalkyl or cycloalkyl-alkyl radical containing from 3 to 8 carbon atoms, with aliphatic alcohols containing from 4 to 8 carbon atoms or with araliphatic alcohols whose alkyl group contains from 2 to 4 carbon atoms, or by reesterifying correspondingly substituted sulfonyl-urethanes derived from other alcohols with aliphatic alcohols containing 4 to 8 carbon atoms or with araliphatic alcohols whose alkylene-group contains from 2 to 4 carbon atoms, or by splitting correspondingly substituted sulfonyl-ureas whose free amino group is disubstituted with aliphatic alcohols containing from 4 to 8 carbon atoms or with araliphatic alcohols whose alkylene group contains from 2 to 4 carbon atoms, or by reacting correspondingly substituted sulfonamides, preferably in the form of their alkali metal salts, with halogeno-formic acid esters derived from aliphatic alcohols containing from 4 to 8 carbon atoms or from araliphatic alcohols whose alkylene-group contains from 2 to 4 carbon atoms; other compounds which in the course of the reaction react like isocyanates being likewise suitable for carrying out the reaction.

Now we have found that sulfonyl-urethanes showing a special efficiency against Coccidae, for instance *Eimeria tenella*, can be prepared by treating sulfonyl-isocyanates of the general formula $R-SO_2-NCO$, in which R represents a phenyl radical wherein one or two hydrogen atoms may be substituted by alkyl or alkoxy groups containing up to 6 carbon atoms, or by halogen atoms, or represents a naphthyl-(2)-, or a 5,6,7,8-tetrahydronaphthyl-(2) radical, a phenylalkyl radical containing up to 10 carbon atoms, a 4-phenoxybenzene or a 4-diphenyl-radical or an alkyl, cycloalkyl, or cycloalkyl-alkyl radical containing up to 8 carbon atoms with low-molecular α-hydroxy-β-alkoxy-ethanes, other compounds which in the course of the reaction react like such isocyanates being likewise allowed for carrying out the reaction, or by reesterifying correspondingly substituted sulfonyl-urethanes derived from other alcohols with low molecular α-hydroxy-β-alkoxy-ethanes or by splitting correspondingly substituted sulfonyl-ureas of the general formula $$R-SO_2-NH-CO-N'H_2$$

or such of the general formula $$R-SO_2-NH-CO-N'H-R_1$$

in which $R_1$ is an aliphatic, aromatic or a mixed aliphatic-aromatic acyl radical, or sulfonyl-ureas of the general formula $R-SO_2-NH-CO-N'<$, in which the N'-atom is disubstituted, with α-hydroxy-β-alkoxy-ethanes or by reacting correspondingly substituted sulfonamides, preferably in the form of their alkali metal salts with halogeno-formic esters derived from low-molecular α-hydroxy-β-alkoxy-ethanes.

In contradistinction to the above-mentioned compounds which have already been proposed the sulfonyl-urethanes of the formula $$R-SO_2-NH-COO-CH_2-CH_2-OCH_3$$

in which R has the meaning given above, surprisingly do not exhibit any or only an insignificant blood sugar lowering effect and, therefore, do not affect the metabolism of carbohydrates of the animals in the sense of the oral antidiabetics.

As starting substances according to the process of the present invention there enter into consideration in addition to the unsubstituted compound such benzene-sulfonamides as contain one or two straight-chained or branched alkyl- or alkoxy-groups containing up to 6 carbon atoms and/or halogen atoms. There are mentioned for instance: ortho-toluene-sulfonamide, meta-toluene-sulfonamide, para-toluene-sulfonamide, ortho-ethyl-benzene-sulfonamide, meta-ethyl-benzene-sulfonamide, para-ethyl-benzene-sulfonamide, ortho-, meta- and para-n-propyl-benzene-sulfonamide, ortho-, meta- and para-isopropyl-sulfonamide, furthermore corresponding ortho-, meta- and para-alkoxy-benzene-sulfonamides, such as ortho-methoxy-benzene-sulfonamide, meta-methoxy-benzene-sulfonamide, para-methoxy-benzene-sulfonamide, dialkyl-benzene-sulfonamides, dialkoxy-benzene-sulfonamides, alkyl-alkoxy-sulfonamides, monohalogen-benzene-sulfonamide, dihalogen-benzene-sulfonamide, as well as halogeno-alkyl-benzene-sulfonamides or halogeno-alkoxy-benzene-sulfonamides. Particularly, there are suitable compounds substituted in meta- or para-position. There can likewise be used straight-chained or ramified alkyl-sulfonamides such as n-propane-sulfonamide, isopropane-sulfonamide, n-butane-sulfonamide, isobutane-sulfonamide, sec.-butane-sulfonamide, tert.-butane-sulfonamide, 3-methyl-butane-sulfonamide, n-hexane-sulfonamide, n-heptane-sulfonamide, n-octane-sulfonamide, cycloalkyl-sulfonamides e.g. cyclopentane sulfonamide, cyclohexane-sulfonamide, cycloheptane-sulfonamide, cycloalkylalkyl-sulfonamides, such as cyclohexyl-methane-sulfonamide, furthermore naphthyl-(2)-sulfonamide, or 5,6,7,8-tetra-hydro-naphthyl-(2)-sulfonamide or 4-phenoxy-benzene-sulfonamide, 4-diphenyl-sulfonamide and ω-benzyl-sulfonamide. Instead of the aforementioned sulfonamides there can also be used as starting substances the corresponding sulfonyl-isocyanates and sulfonyl-carbamic acid halides. Finally, there come into consideration corresponding sulfonyl-urethanes, particularly the methyl- or ethyl-urethanes which can be reesterified by means of α-hydroxy-β-alkoxy-ethanes. Furthermore can be used as starting materials: benzene-sulfonylureas containing in the benzene nucleus one or two straight-chained or branched alkyl or alkoxy-groups containing up to 6 carbon atoms and/or halogen atoms. There are mentioned for example: ortho-, meta- and para-toluene-sulfonyl-urea, ortho-, meta- and para-ethyl-benzene-sulfonylurea, ortho-, meta- and para-propyl-benzene-sulfonylurea, ortho-, meta- and para-isopropyl-benzene-sulfonylurea, furthermore corresponding ortho-, meta- and para-alkoxy-benzene-sulfonylureas, such as ortho-, meta- and para-methoxy-benzene-sulfonylurea, dialkyl-benzene-sulfonylureas, dialkoxy-benzene-sulfonylureas, alkyl-alkoxy-benzene-sulfonylureas, mono-halogeno-benzene-sulfonylureas, dihalogeno-benzene-sulfonylureas. There can likewise be used straight-chained or branched alkane-sulfonylureas, such as propane sulfonylurea, isopropane-sulfonylurea, butane-sulfonylurea, isobutane-sulfonylurea, 3-methylmethane-sulfonylurea, hexane-sulfonylurea, heptane-sulfonylurea, octane-sulfonylurea, cycloalkane-sulfonylurea, cycloalkylalkane-sulfonylureas, such as cyclohexyl-methane-sulfonylureas, likewise naphthalene-2-sulfonylurea, or 5,6,7,8-tetrahydro-naphthalene-(2)-sulfonyl-urea or 4-phenoxy-benzene-sulfonylurea or 4-diphenyl-sulfonylureas and ω-benzyl-sulfonylurea. Furthermore, there can advantageously be used corresponding N-sulfonyl-N'-acyl-ureas, as acyl radicals being suitable especially low fatty acid groups such the acetyl-group, the propionyl-group, the butyryl-group, as well as aromatic carboxylic radicals, e.g. the benzoyl radical, or mixed aliphatic/aromatic carboxylic radicals, for instance the phenacetyl radical. As starting substances there can be mentioned for example the following N-sulfonyl-N'-acylureas: N-benzene-sulfonyl-N'-acetyl-(propionyl-butyryl)-urea, N-(4-methyl-benzene-sulfonyl)-N'-acetyl-(propionyl-butyryl)-urea, N-(4-isopropyl-benzene-sulfonyl)-N-acetyl-(propionyl-butyryl)-urea, N-(4-chloro-benzene-sulfonyl)-N'-acetyl-(propionyl-butyryl)-urea, N-(4-methyl-3-methoxy-benzene-sulfonyl)-N'-acetyl-urea, furthermore straight-chained or branched alkane-sulfonyl-acylureas, for instance N-butane-sulfonyl-N'-acetyl-urea, as well as cycloaliphatic sulfonyl-acylureas, such as N-cyclohexane-N'-acetyl-urea and the like.

For the reaction with the above-mentioned compounds there are used α-hydroxy-β-alkoxy-ethanes or the halogenoformic esters of these compounds such as chloroformic acid-β-alkoxyethyl-ester. As alkoxy-groups the compounds may contain for example methoxy, ethoxy, propoxy and butoxy groups, the two last-mentioned groups can also be branched. The methoxy-group is particularly suited (glycol-monomethyl-ether).

The reaction is carried out in the usual manner. The reesterification is favorably carried out in the presence of catalytically active tertiary organic bases, alkali metal hydroxides or alkali metal alcoholates. When starting from corresponding sulfonamides these are favorably reacted in the form of their alkali metal salts with the corresponding halogeno-formic esters.

The reaction of corresponding sulfonylureas is advantageously carried out in such a manner that the sulfonyl-ureas are heated for some hours under reflux with an excess of for instance glycol-monomethyl-ether. Substances which promote the reaction can be added, for instance glacial acetic acid. It is likewise possible to obtain the products of the invention by using intermediarily formed sulfonylureas which are obtained by heating to boil corresponding sulfonamides, suitably in the form of their alkali-metal salts with urea in a solution of glycol-monomethyl-ether.

The products of the invention form well crystallizing alkali metal salts, in particular sodium salts which can easily be purified which quality is much appreciated for the administration of the products, the more so as these salts are characterized by a large resistance and a good solubility in water with nearly neutral reaction.

The products of the invention which are favorably used in the form of their salts but also in the presence of substances which cause salt formation are valuable medicaments for veterinary medicine and serve for combating the chicken (poultry) coccidiosis.

The compounds obtained according to the invention constitute a new class of substances without sulfonamide character specifically acting on organisms provoking coccidiosis. An action on bacteria does not take place. Therefore, a resistance of the intestinal bacteria against sulfonamides is not developed.

In the following test report the efficiency of N-(4-methyl-benzene-sulfonyl)-(β-methoxyethyl)-urethane and related urethanes is shown by application by means of the oesophageal sound and by drinking water tests for therapeutic purposes in chickens.

TABLE 1

*Application by oesophageal sound for prophylaxis*

| No. | Dose, grams/ kilogram | Preparation | Surviving total number | Average increase in weight at test end, grams |
|---|---|---|---|---|
| 1 | 0.01 | N-(4-methyl-benzene-sulfonyl)-(β-methoxy-ethyl)-urethane. | 8/10 | +17.4 |
| 2 | 0.01 | ----do---- | 8/10 | +23.0 |
| 3 | 0.01 | N-4-isopropyl-benzene-sulfonyl-(β-methoxy-ethyl)-urethane. | 4/10 | +11.8 |

The tests were carried out in experimentally infected chickens (*Eimeria tenella*). In each test all untreated infected control animals (not shown in the table) died. The indicated dose was given once per day by means of the oesophageal sound for 7–8 successive days, starting immediately after the infection. The "surviving total number" shows the number of surviving animals 10–12 days after starting the test and referred to the total number of test animals. The autopsy carried out in each case showed the healing of these animals.

TABLE 2

*Drinking water test for therapeutic purposes*

| No. | Concentration of N-(4-methyl-benzene-sulfonyl)-(β-methoxy-ethyl)-urethane in drinking water, percent | Surviving total number | Average increase in weight at the end of test, grams |
|---|---|---|---|
| 1 | 0.2 | 6/10 | +9.8 |
| 2 | 0.2 | 9/15 | +10.4 |
| 3 | 0.2 | 7/13 | +10.7 |

The tests were carried out in chickens experimentally infected (*Eimeria tenella*). In each test all untreated infected control animals (not shown in the table) died. When the disease reached its maximum development (4–5 days following the infection) the animals were given for 3 days any desired amount of water in which the preparation in the form of its sodium salt was dissolved in the indicated concentration. The "surviving total number" constitutes the number of surviving animals 10–12 days after starting the test and referred to the total number of test animals treated. The autopsy carried out in each case proved the healing of these animals.

The products of the present invention are of special importance as anti-coccidiosis agents, since their easily soluble alkali metal salts with tetracycline base or tetracycline hydrochloride or tetracycline derivatives, for instance pyrrolidino-methyl-tetracycline in combination and if necessary with addition of substances delaying the oxidation of tetracycline, such as sodium-cyanosulfite, can be added to the drinking water of the animals. The concentrations may amount for example to 0.2–0.3% of sulfonyl-urethane and 0.01 to 0.03% of tetracycline. Although it is known to use tetracycline as an agent against coccidiosis, tests with drinking water surprisingly showed that for instance when using an aqueous solution of 0.2% of N-(4-methyl-benzene-sulfonyl)-(β-methoxyethyl)-urethane and 0.02% of tetracycline-hydrochloride the efficiency was raised to a degree which exceeded the additive efficiency of the two components, since the increased dose of each component per se did not lead to a better therapeutic result.

TABLE 3
*Combined tests*

| No. | Concentration in drinking water | | Surviving total number | Average increase in weight at the end of test, grams |
|---|---|---|---|---|
| | of N-(4-methyl-benzene-sulfonyl)-(β-methoxy-ethyl)-urethane, percent | of tetracycline, percent | | |
| 1 | 0.2 | ---- | 5/10 | +3.1 |
| | ---- | 0.02 | 8/10 | +10.8 |
| | 0.2 | 0.02 | 10/10 | +14.6 |
| 2 | 0.2 | ---- | 9/25 | +8.0 |
| | ---- | 0.02 | 15/25 | +12.0 |
| | 0.2 | 0.02 | 22/25 | +12.6 |
| 3 | 0.2 | ---- | 7/13 | +10.7 |
| | ---- | 0.02 | 8/13 | +13.2 |
| | 0.2 | 0.02 | 13/13 | +16.5 |

The tests were carried out in chickens experimentally infected (*Eimeria tenella*). In each test all untreated infected control animals (not shown in the table) died. When the disease reached its maximum (4–5 days following the infection) the animals were given for three days any desired amount of water in which the sulfonyl-urethane in the form of its sodium salt was dissolved in the indicated concentration. The "surviving total number" constitutes the number of surviving animals 10–12 days after starting the test and referred to the total number of test animals treated. The autopsy carried out in each case proved the healing of these animals.

The new compounds obtained according to the process of the invention are superior to known compounds of comparable structure, for instance the N-(p-toluene-sulfonyl)-methyl-urethane, as regards specific efficiency. As shown in Table 1 a dose of 0.01 gram/kilogram of N-(p-toluene-sulfonyl)-methyl-urethane causes a "surviving total number" of 1/10 only.

The following examples serve to illustrate the invention but they are not intended to limit it thereto:

EXAMPLE 1.—N-(4-METHYL-BENZENE-SULFONYL)-(β-METHOXY-ETHYL)-URETHANE (a) 47 grams of para-toluene-sulfonyl-isocyanate are dissolved in 100 cc. of ethyleneglycol-monomethyl-ether, whereby vigorous heating sets in. The solution is still heated for 15 minutes on the steam bath, allowed to cool and cooled with ice. Upon trituration the N-(4-methyl-benzene-sulfonyl)-(β-methoxy-ethyl)-urethane crystallizes out. The yield amounts to 40 grams, the melting point of the substance to 141–133° C. By evaporation of the mother liquor a further amount of substance can be recovered. The sulfonyl-urethane can be recrystallized, for example, from methanol, its melting point remaining unchanged. For conversion into the sodium salt 550 grams of N-(4-methyl-benzene-sulfonyl)-(β-methoxy-ethyl)-urethane are suspended favorably in 5 to 10 times its amount of ethyl alcohol and the equivalent amount of sodium hydroxide solution is added while stirring. Stirring is continued for some hours and the sodium salt formed is filtered off with suction. The yield amounts to 540 grams. The salt melts at 212–213° C. and is easily soluble in water while showing a neutral reaction. By distillation under reduced pressure a further amount of substance is obtained which can be purified by conversion into the free urethane.

(b) 460 grams of crude N-(4-methyl-benzene-sulfonyl)-methyl-urethane (of about 94% strength). 2000 cc. of glycol-monomethyl-ether and 4 grams of sodium hydroxide or the equivalent amount of sodium-methylate or 202 grams of triethylamine are heated for 4 hours to smooth boiling. The methyl alcohol formed is slowly distilled off through a descending cooler with high neck. The solution is concentrated under reduced pressure and 1.55 liter of glycol-monomethyl-ether is recovered. The solid residue is dissolved in 4 liters of ammonia solution of about 1% strength by heating. The solution is cooled, filtered and the filtrate is acidified cautiously while stirring. A crystal magma of N-(4-methyl-benzene-sulfonyl)-(β-methoxy-ethyl)-urethane is obtained which is sucked off and washed again with water. After drying the crystals melt at 126–127° C. The yield amounts to 476 grams (87% of the theoretical yield). The product can be transformed according to Example 1a into the sodium salt, no further purification being necessary.

(c) 19.3 grams of the sodium salt of para-toluene-sulfonamide and 13.8 grams of finely pulverized potassium carbonate are suspended in 500 cc. of acetone. The reaction mixture is heated to boil and, while stirring, 15.3 grams of chloroformic acid-β-methoxy-ethyl ester are added dropwise in the course of 2 hours. After a further stirring of 2 hours the mixture is allowed to cool, the precipitate is vacuum filtered, dissolved in 100 cc. of water, filtered and the filtrate is cautiously acidified by means of hydrochloric acid. The crystals of N-(4-methyl-benzene-sulfonyl)-(β-methoxy-ethyl)-urethane obtained are vacuum filtered, washed with water and dried. The substance melts at 131–133° C. The yield amounts to 23 grams (89% of the theoretical).

The following table shows a number of N-sulfonyl-(β-methoxy-ethyl)-urethanes obtained in good yields from sulfonyl-isocyanates and glycol-monomethyl-ether according to Example 1a, from sulfonyl-methyl-urethanes by reesterification according to Example 1b and from sulfonamides and chloroformic acid-β-alkoxy-ethyl-ester according to Example 1c.

TABLE

| No. | Product | Melting point, degrees | Method according to Example— | Crystallizing agent |
|---|---|---|---|---|
| 1 | N-Benzenesulfonyl-(β-methoxyethyl)-urethane. | 73–74 | 1b | ethanol/water. |
| 2 | N-(4-ethyl-benzene-sulfonyl)-(β-methoxy-ethyl)-urethane. | 109–111 | 1b | isopropanol. |
| 3 | N-(4-Isopropyl-benzene-sulfonyl)-(β-methoxy-ethyl)-urethane. | 81–83 | 1b | methanol/water. |
| 4 | N-(3-Methyl-benzene-sulfonyl)-(β-methoxy-ethyl)-urethane. | 96–98 | 1c | methanol. |
| 5 | N-(4-Methoxy-benzenesulfonyl)-(β-methoxy-ethyl)-urethane. | 81–82 | 1c | ethanol/water. |
| 6 | N-(4-Chloro-benzene-sulfonyl)-(β-methoxy-ethyl)-urethane. | 117–119 | 1a | methanol. |
| 7 | N-(3-Chloro-4-methyl-benzene-sulfonyl)-(β-methoxy-ethyl)-urethane. | 113–115 | 1a | Do. |
| 8 | N-(3,4-Dichlorobenzenesulfonyl)-(β-methoxy-ethyl)-urethane. | 122–123 | 1c | ethanol/water. |
| 9 | N-(3,4-Dimethyl-benzene-sulfonyl)-(β-methoxy-ethyl)-urethane. | 131–132 | 1c | Do. |
| 10 | N-(3,4-Dimethoxy-benzene-sulfonyl)-(β-methoxy-ethyl)-urethane. | 90–91 | 1b | Do. |
| 11 | N-(2-Methyl-6-chloro-benzene-sulfonyl)-(β-methoxy-ethyl)-urethane. | 130–131 | 1c | methanol. |
| 12 | N-Naphthalene-(2)-sulfonyl-(β-methoxy-ethyl)-urethane. | 110–112 | 1b | methanol/water. |
| 13 | N-ω-Benzyl-sulfonyl-(β-methoxy-ethyl)-urethane. | 86–88 | 1c | acetic ester/cyclohexane. |
| 14 | N-Cyclohexane-sulfonyl-(β-methoxy-ethyl)-urethane. | 66–68 | 1b | acetic ester. |
| 15 | N-Butane-sulfonyl-(β-methoxy-ethyl)-urethane. | oily | 1c | |

TABLE—Continued

| No. | Product | Melting point, degrees | Method according to Example— | Crystallizing agent |
|---|---|---|---|---|
| 16 | N-(2-Methyl-benzene-sulfonyl)-(β-methoxy-ethyl)-urethane. | 88–89 | 1c | ethanol/water. |
| 17 | N-(4-Methyl-benzenesulfonyl)-(β-ethoxy-ethyl)-urethane. | 79–81 | 1b | ether. |
| 18 | N-(4-Methyl-benzene-sulfonyl)-(β-butoxy-ethyl)-urethane as sodium salt. | oily 211–213 | 1b | water. |

EXAMPLE 2

21.4 grams of N-(4-methyl-benzene-sulfonyl)-urea are dissolved in 200 cc. of glycol-monomethyl ether. The solution is heated for 8 hours under reflux to boiling. The excessive solvent is distilled off under reduced pressure, the residue thus obtained is treated with an aqueous ammonia solution of about 1% strength, any undissolved matter is filtered off and the filtrate is acidified by means of hydrochloric acid. The crystalline precipitate of N-(4-methyl-benzene-sulfonyl)-(β-methoxy-ethyl)-urethane (5 grams) thus obtained is recrystallized from methanol and melts at 131–133° C.

EXAMPLE 3

25.6 grams of N-(4-methyl-benzene-sulfonyl)-N'-acetyl-urea are dissolved in 200 cc. of glycol-monomethyl ether. The solution is heated to boiling for 4 hours under reflux, the excessive glycol-monomethyl ether is distilled off and the residue thus obtained is treated by means of an aqueous ammonia solution of about 1% strength. The filtrate separated from undissolved toluene-sulfonamide is acidified. A crystalline precipitate of N-(4-methyl-benzene-sulfonyl)-(β-methoxy-ethyl)-urethane is obtained which is vacuum filtered and dried. The yield amounts to 19 grams. The substance melts at 131–132° C. after having been recrystallized from methanol.

EXAMPLE 4

30.5 grams of N-(4-chloro-benzene-sulfonyl)-N'-butyryl-urea produced by heating of N-(4-chloro-benzene-sulfonyl)-urea and butyric acid anhydride in the presence of a small amount of concentrated sulfuric acid are dissolved by heating in 200 cc. of glycol-monomethyl ether. The mixture is heated to boil for three hours under reflux. The excessive glycol-monomethyl ether is distilled off under reduced pressure, the residue obtained is treated with an aqueous ammonia solution of 1% strength and filtered. The filtrate is acidified with hydrochloric acid, the crystals obtained are vacuum filtered and dried on clay. 20 grams of N-(4-chloro-benzene-sulfonyl)-(β-methoxy-ethyl)-urethane are obtained which after having been recrystallized from dilute methanol melt at 116–118° C.

EXAMPLE 5

A mixture consisting of 19.5 grams of the sodium salt of p-toluene-sulfonamide, 12 grams of urea and 38 grams of glycol-monomethyl ether is heated to boiling for 6 hours. The excessive glycol-monomethyl ether is distilled off under reduced pressure, the residue obtained is treated with an ammonia solution of about 1% strength, filtered and the filtrate is acidified by means of hydrochloric acid. The crystals of N-(4-methyl-benzene-sulfonyl)-(β-methoxy-ethyl)-urethane obtained are vacuum filtered and dried. The yield amounts to 4 grams; after recrystallization from methanol the substance melts at 131–133° C.

EXAMPLE 6

33.4 grams of N-(4-methyl-benzene-sulfonyl)-N'-diphenyl-urea are dissolved in 250 cc. of glycol-monomethyl ether and heated to boil for 4 hours under reflux. The excessive solvent is distilled off under reduced pressure and the residue is treated with an aqueous ammonia solution of about 1% strength. The filtrate is acidified, the N-(4-methyl-benzene-sulfonyl)-methoxy-ethyl-urethane is sucked off and recrystallized from methanol. Melting point 131–133° C.

We claim:

1. A compound of the group consisting of sulfonyl urethanes of the general formula

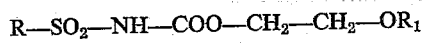

wherein R is a member of the group consisting of phenyl groups of the formula

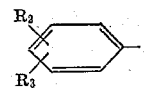

($R_2$ and $R_3$ being members of the group consisting of hydrogen, chlorine, methoxy, and alkyl groups containing from one to three carbon atoms), β-naphthyl, benzyl, cyclohexyl and butyl groups; and $R_1$ represents an alkyl group containing up to four carbon atoms; and non-toxic basic salts of these compounds.

2. The compound of the formula

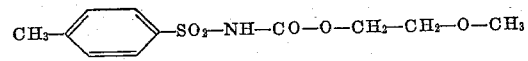

3. The compound of the formula

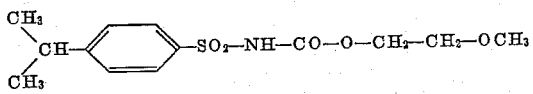

4. The compound of the formula

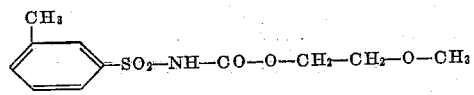

5. The compound of the formula

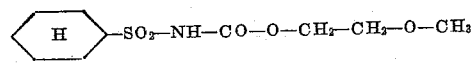

6. The compound of the formula

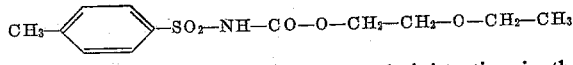

7. A solution effective on oral administration in the treatment of poultry coccidiosis, said solution containing from 0.2 to 0.3% of a non-toxic basic salt of a sulfonyl urethane of the general formula

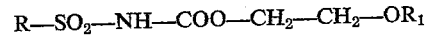

wherein R is a member of the group consisting of phenyl groups of the formula

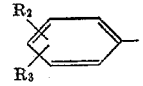

($R_2$ and $R_3$ being members of the group consisting of hydrogen, chlorine, methoxy, and alkyl groups containing from one to three carbon atoms), β-naphthyl, benzyl, cyclohexyl, and butyl groups; and $R_1$ represents an alkyl group containing up to four carbon atoms, and from 0.01 to 0.03% of a member of the group consisting of tetracycline, tetracycline derivatives and non-toxic acid addition salts of these antibiotics.

(References on following page)

References Cited in the file of this patent

UNITED STATES PATENTS 2,907,693    Price et al. _____ Oct. 6, 1959

FOREIGN PATENTS 122,777    Sweden _____ Dec. 27, 1944
845,042    Germany _____ July 28, 1952

OTHER REFERENCES

Herrick et al.: Am. J. Vet. Res., "The Experimental Use of Organic Sulfur Compounds for the Prevention of Cecal Coccidiosis in Chickens," January 1942, pp. 117–127.